United States Patent
Yin

(10) Patent No.: US 9,908,227 B1
(45) Date of Patent: Mar. 6, 2018

(54) QUICK DISCONNECT STORAGE COMPARTMENT FOR HANDHELD DEVICES

(71) Applicant: NUNCHUCK GRIPS, LLC, Orange, CA (US)

(72) Inventor: Mike Tysong Yin, Santa Ana, CA (US)

(73) Assignee: NUNCHUCK GRIPS, LLC, Santa Ana, CA (US)

(*) Notice: Subject to any disclaimer, the term of this patent is extended or adjusted under 35 U.S.C. 154(b) by 0 days.

(21) Appl. No.: 15/190,053

(22) Filed: Jun. 22, 2016

Related U.S. Application Data

(60) Provisional application No. 62/275,320, filed on Jan. 6, 2016.

(51) Int. Cl.
  *B25G 1/08* (2006.01)
  *B25C 1/08* (2006.01)

(52) U.S. Cl.
  CPC ..................... *B25C 1/08* (2013.01)

(58) Field of Classification Search
  CPC .. A45B 3/00; A45B 9/02; B62K 21/26; B62K 21/125; B25G 1/08
  USPC ........ 135/16, 66; 16/111.1; 74/551.8, 551.9; 81/490
  See application file for complete search history.

(56) References Cited

U.S. PATENT DOCUMENTS

| | | | | |
|---|---|---|---|---|
| 2,469,944 A | * | 5/1949 | Bauters | B62J 6/005 340/432 |
| 2,496,707 A | * | 2/1950 | Frye | B26B 3/06 16/111.1 |
| 2,603,701 A | * | 7/1952 | Schadel, Jr. | B62J 6/005 340/432 |
| 4,617,951 A | | 10/1986 | Adams et al. | |
| 4,656,564 A | * | 4/1987 | Felder | B62J 6/00 340/432 |
| 4,779,169 A | * | 10/1988 | Cruze | B62J 6/005 340/432 |
| 4,875,142 A | * | 10/1989 | Spector | B62J 6/005 362/202 |

(Continued)

FOREIGN PATENT DOCUMENTS

| | | |
|---|---|---|
| CA | 2465549 | 11/2005 |
| CN | 201120940 | 9/2008 |
| EP | 2426040 | 7/2012 |

OTHER PUBLICATIONS

Rain Noe, Bike Tools Designed to be Hidden Within Handlebars, Core77 (website), Published Jun. 6, 2012, Retrieved from the Internet as early as Feb. 25, 2016, <URL: http://www.core77.com/posts/22599/bike-tools-designed-to-be-hidden-within-handlebars-22599?utm_source=feedburner>.

*Primary Examiner* — Noah Chandler Hawk
(74) *Attorney, Agent, or Firm* — Stetina Brunda Garred and Brucker

(57) ABSTRACT

A quick disconnect storage compartment for handheld devices disclosed herein. The storage compartments incorporated into the handle of the handheld device so that objects stored within the handle are concealed and not noticeable to others. The quick disconnect feature requires that the user depress two buttons on opposite sides of each other so that a cover or endcap that covers an opening of the handle for accessing the object within the handle does not inadvertently become dislodged but requires that the user intentionally and actively depress the buttons with opposing forces with his or her fingers.

12 Claims, 13 Drawing Sheets

(56) References Cited

U.S. PATENT DOCUMENTS

| | | | | |
|---|---|---|---|---|
| 5,083,108 | A * | 1/1992 | Guest | B62J 3/00 340/384.6 |
| 5,247,431 | A * | 9/1993 | Liu | B62J 6/005 362/474 |
| 5,251,341 | A | 10/1993 | Seals | |
| 5,482,071 | A * | 1/1996 | Liu | A45B 3/00 135/66 |
| 5,950,498 | A * | 9/1999 | Gossett | B62K 19/46 224/420 |
| 6,035,742 | A | 3/2000 | Hollingsworth et al. | |
| 6,263,759 | B1 | 7/2001 | Hollingsworth et al. | |
| 6,305,815 | B1 * | 10/2001 | Lin | B25G 1/043 362/119 |
| 6,308,590 | B1 * | 10/2001 | Berto | B62K 21/12 74/551.8 |
| 6,564,982 | B1 | 5/2003 | Woods et al. | |
| 6,615,687 | B2 * | 9/2003 | Bendetti | B62K 21/26 74/551.8 |
| 7,051,626 | B1 * | 5/2006 | Chen | B25G 1/085 403/290 |
| 7,281,455 | B2 * | 10/2007 | Hu | B25G 1/085 81/177.4 |
| 7,377,673 | B1 * | 5/2008 | Hsiao | B62J 6/00 362/190 |
| 7,779,732 | B2 * | 8/2010 | Abel | B25G 1/08 81/177.4 |
| 7,958,804 | B2 * | 6/2011 | Badiali | B25G 1/005 16/430 |
| 7,992,258 | B1 | 8/2011 | Stitser | |
| 8,365,635 | B2 * | 2/2013 | Grimes | B62K 21/26 74/551.8 |
| 8,534,166 | B2 * | 9/2013 | Hsu | B25G 1/085 81/177.4 |
| 8,555,609 | B1 | 10/2013 | Chamberlain et al. | |
| 9,101,818 | B2 | 8/2015 | Carr | |
| 9,180,579 | B2 * | 11/2015 | Hsu | B25B 15/00 |
| 2008/0179904 | A1 * | 7/2008 | Huang | B25G 1/08 294/51 |
| 2011/0051442 | A1 * | 3/2011 | Chang | B62J 6/005 362/474 |
| 2012/0000313 | A1 * | 1/2012 | Zacks | B62K 19/46 74/551.8 |
| 2014/0290314 | A1 * | 10/2014 | Poehlmann | E05B 71/00 70/18 |

* cited by examiner

QUICK DISCONNECT STORAGE COMPARTMENT FOR HANDHELD DEVICES

CROSS-REFERENCE TO RELATED APPLICATIONS

This application claims priority to U.S. Prov. Pat. App. Ser. No. 62/275,320, filed on Jan. 6, 2016, the entire contents of which is expressly incorporated herein by reference.

STATEMENT RE: FEDERALLY SPONSORED RESEARCH/DEVELOPMENT

Not Applicable

BACKGROUND

Outdoor activities typically require the use of a device such as a walking stick, umbrella or other mechanism. However, in certain circumstances, the user also needs to carry a backpack or other means of carrying other equipment during such outdoor activity. In some cases, the extra equipment required to participate in some outdoor activities is minimal but yet still requires the user to carry a backpack or other large carrying device to carry the extra equipment. Unfortunately, the backpack adds bulk and weight to the user. Moreover, extra equipment may also be strapped to the user with straps, brackets and other attachment mechanism but these non-backpack solutions also add bulk to the user when participating in certain outdoor activities.

Accordingly, there is a need in the art for an improved method and device for carrying extra equipment while participating in an outdoor activity.

BRIEF SUMMARY

The various embodiments described herein is related to a quick disconnect storage compartments that can be incorporated into handheld devices such as umbrellas, walking sticks, bicycle handlebars, etc.

The quick disconnect storage compartment utilizes an interior cavity of the handle of the handheld device to store an object including but not limited to a tool, knife, pepper spray and other objects that are described herein. The interior cavity is accessible through an opening at a distal end of the handle. Moreover, the interior cavity may be covered with an end cap or cover that is removably attachable to the distal end of the handle to prohibit access to the interior cavity. The object may be attached or secured to the endcap or cover so that removal of the end cap or cover also removes the object from the handle. The latching mechanism used to secure the endcap or cover to the handle may be operated by depressing two buttons on opposite sides so that opposed forces must be applied to the two buttons to release the endcap or cover from the handle. In this matter if and when the handle contacts an object or ground, the end cap cover does not inadvertently become dislodged from the handle. The buttons may be incorporated into the endcap or the handle. In operation, the user grips the endcap or cover, and thus the buttons with one hand and the handle with the other hand. By utilizing the interior cavity of the handle to store an object, the object is concealed from others. If the object is a weapon such as a knife, then carrying the knife is not threatening to others yet the user is able to quickly deploy the weapon for self-defense.

More particularly, a method for deploying an object hidden within a handle of a handheld device is disclosed. The method may comprise the steps of gripping a handle with a first hand of a user; gripping an end cap with a second hand of the user; applying oppositely directed forces on first and second buttons formed on either the handle or the cap; disengaging first and second latches formed on the first and second buttons from first and second catches formed on the handle or cap; and pulling the cap with the second hand of the user to remove the object from the handle.

In the method, the applying step may include the step of applying oppositely directed forces 180 degrees apart from each other.

In another aspect, a handheld umbrella having a concealed compartment for holding a tool is disclosed. The umbrella may comprise a shroud collapsible at a central portion of the shroud; a central post connected to the central portion of the shroud; a handle and a cover.

The handle may be attached to the central post. The handle may define a proximal end portion and an opposed distal end portion. The handle may define an interior cavity and an opening at the proximal end portion of the handle. The interior cavity may be accessible through the opening at the proximal end portion of the handle. A recess may be formed at the proximal end portion of the handle. The proximal end portion of the handle may have first and second parts of a latching mechanism. The first and second parts may be disposed on opposite sides of the proximal end portion.

The cover is removably attachable to the handle to block access to the interior cavity when the cover is attached to the handle and to allow access to the interior cavity when the cover is removed from the handle. The cover may have opposed mating third and fourth parts that are respectively removably engageable to the first and second parts of the handle for attaching the cover to the handle and removing the cover from the handle.

The first and second parts may be 180 degrees apart from each other.

The first and second parts may be integrally formed in the proximal end portion of the handle.

The first and second parts may be incorporated into a collar attached to the handle at the proximal end portion.

The first and second parts may be undercut recesses formed in an interior surface of the handle at the proximal end portion. The mating first and second parts may be protrusions formed in the cap that are traversable between biased out position to engage the mating first and second parts to the first and second parts and a depressed in position to disengage the mating first and second parts to the first and second parts.

In another aspect, a handheld walking stick having a concealed compartment for holding a tool is disclosed. The walking stick may comprise an elongate tubular member, a handle, a cover.

With respect to the elongate tubular member, a distal end of the tubular member may be used to contact the ground and support a user.

The handle may be attached to the elongate tubular member. The handle may define a proximal end portion and an opposed distal end portion. The handle may define an interior cavity and an opening at the proximal end portion of the handle. The interior cavity may be accessible through the opening at the proximal end portion of the handle. The recess may be formed at the proximal end portion of the handle. The proximal end portion of the handle may have first and second parts of a latching mechanism. The first and second parts may be disposed on opposite sides of the proximal end portion.

The cover may be removably attachable to the handle to block access to the interior cavity when the cover is attached to the handle and to allow access to the interior cavity when the cover is removed from the handle. The cover may have opposed mating third and fourth parts that are respectively removably engageable to the first and second parts of the handle for attaching the cover to the handle and removing the cover from the handle.

The third and fourth parts may be traversed between engaged and disengaged positions by actuating buttons which are formed integrally with the third and fourth parts.

The first and second parts may be traversed between engaged and disengaged positions by actuating buttons which are formed integrally with the first and second parts.

The object may be longer than a length of the handle.

The first and third parts may be angularly offset from the second and fourth parts 180 degrees from each other.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
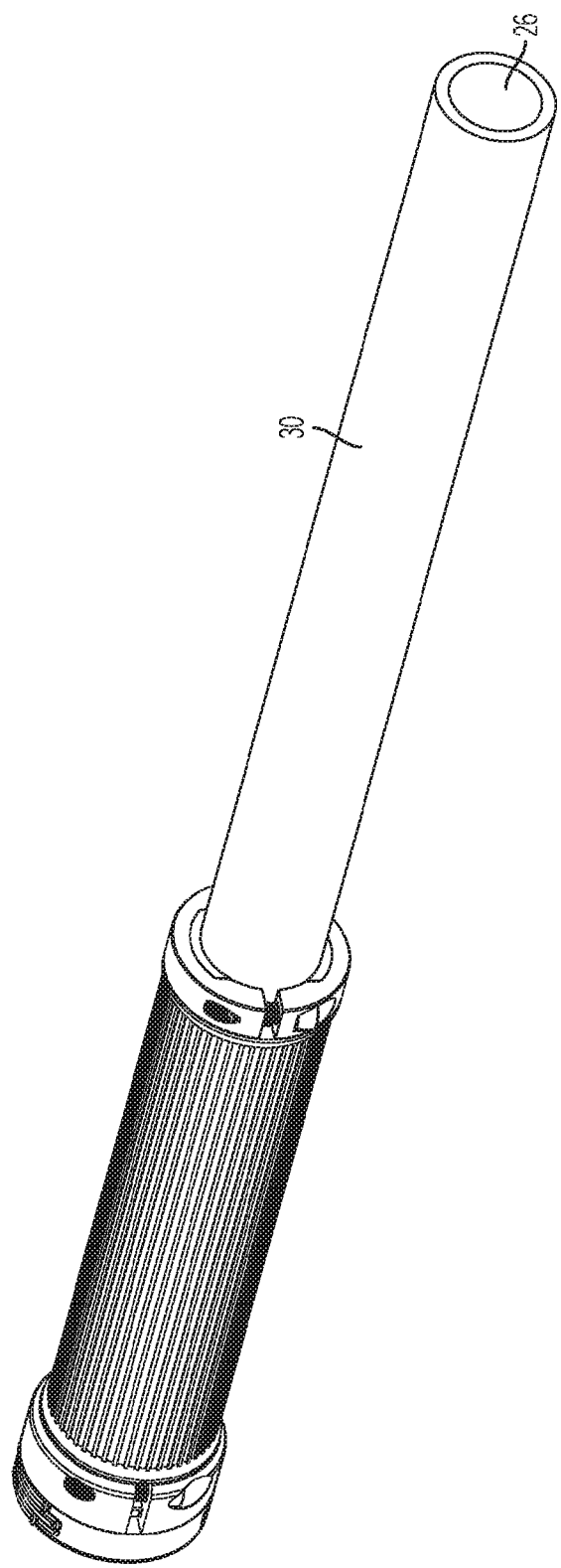
FIG. 1 illustrates a first embodiment of a quick disconnect storage compartment.

Referring now to the drawings, an object 10 which is concealed carried within a handle 12 is shown. The tool 10 may be a pepper spray 14, a tool 16, a tube 18 for carrying things, a knife 20, a battery 22 for powering a battery-operated device 24 (e.g. light 24a or speaker 24b). The object 10 may be disposed within the cavity 26 defined by the handle 12 and removably secured therein. To remove the object 10 from the cavity 26, the user may grip the handle 12 with a first hand and pull an end cap 28 off of the handle 12 with a second hand. A latching mechanism may be incorporated into the handle or the end cap 28. The latching mechanism may be operated by either the first or second hand. The latching mechanism may require opposing clamping forces in order to remove the end cap 28 from the handle 12. This feature mitigates inadvertent dislodging of the object 10 from the cavity 26 in the event that the handle contacts a table, ground or other hard object. Symmetrical or asymmetrical opposed forces are required to disengage the latching mechanism. Dropping the device would produce a uni-directional force that might actuate one of two buttons of the latching mechanism but not both.

Figure 2:
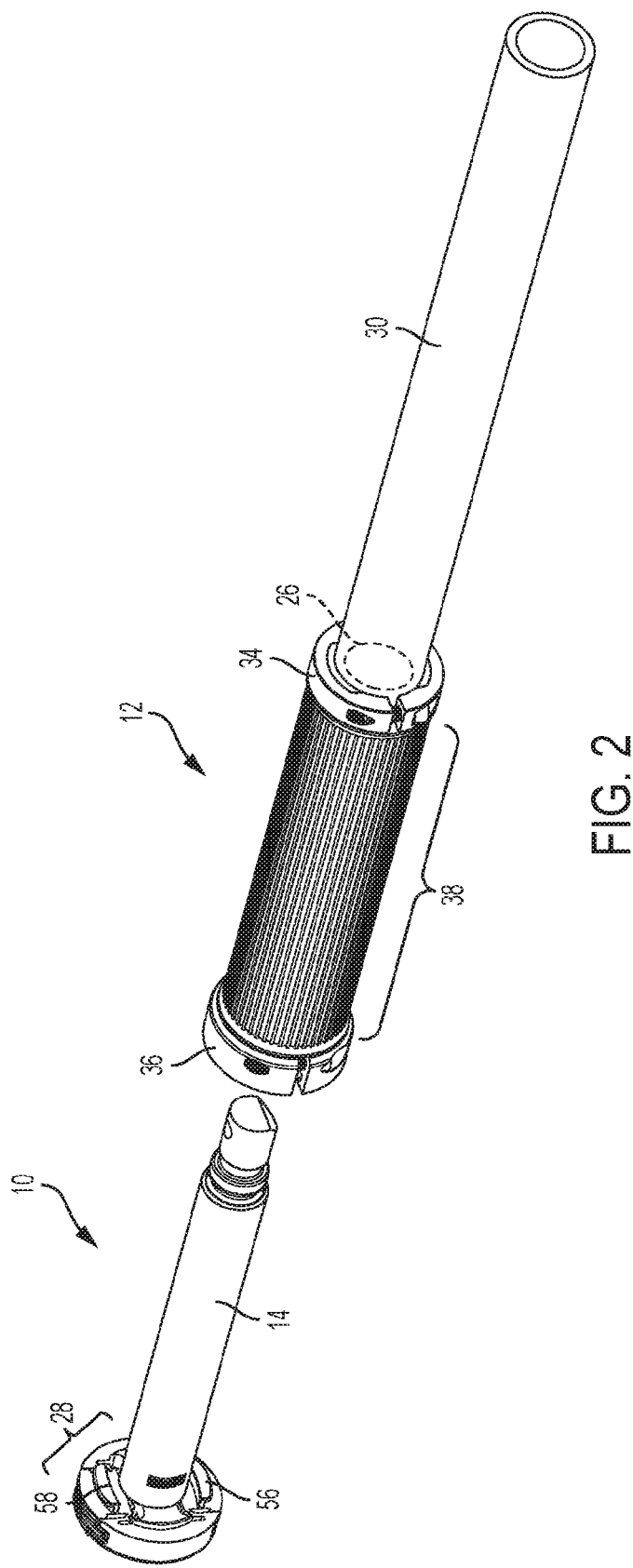
FIG. 2 illustrates the first embodiment of the quick disconnect storage compartment with the object removed from a handle.
Figure 3:
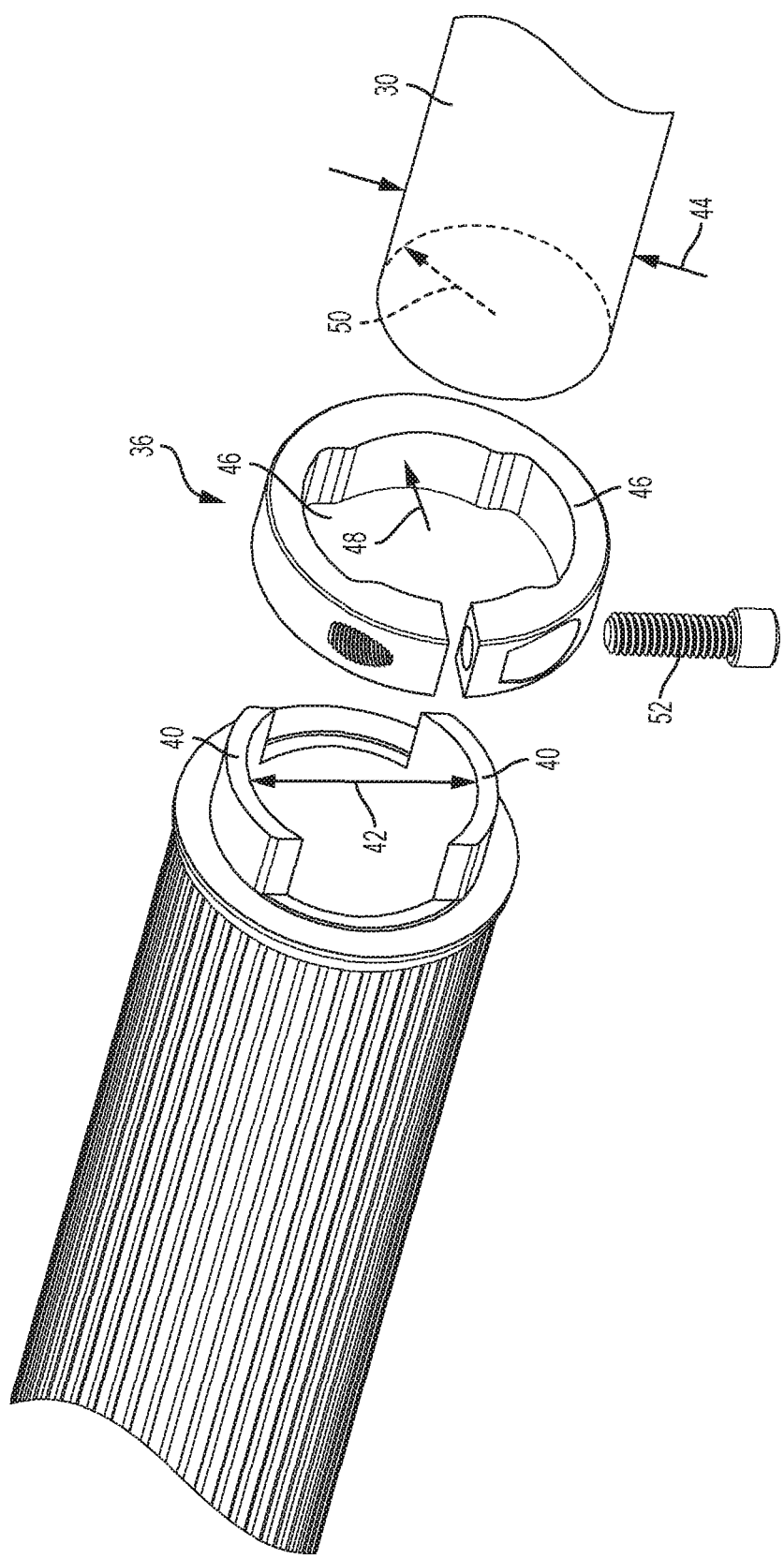
FIG. 3 illustrates an exploded perspective view of a collar for attaching the handle to a tube.

Referring now to FIG. 1, a portion of a bicycle handlebar 30 is shown. The bicycle handlebar 30 is hollow, defining the cavity 26 that may extend end to end throughout the tube of the handlebar 30. A grip 32 is disposable over an end portion of the handlebar 30 and securable to the end portion of the handlebar 30 by way of collars 34, 36. The grip 32 has a gripping portion 38. On opposed sides of the gripping portion 38, flanges 40 extend past the gripping portion 38. An inner diameter 42 of the flanges 40 is equal to or few thousands of an inch larger than an outer diameter 44 of the handlebar 30. The flanges 40 may preferably be fabricated from a plastic material that is rigid but yet slightly deformable so that the collars 34, 36 can squeeze the flanges 40 into frictional engagement with the exterior surface of the tube of the handlebar 30. The proximal collar 34 may have a circular outer circumference and a grooved inner circumference that receives the flanges 40. In particular, the inner circumference of the collars 34, 36 may have two grooves 46. The two grooves 46 receive the flanges 40 and the interior surfaces of the grooves 46 contact the exterior surfaces of the flanges 40. Moreover, an inner radius 48 of the collars 34, 36 may be equal to or slightly greater than an outer radius 15 of the handlebar 30 so that the interior surface defined by the inner radius 48 can contact the exterior surfaces of the handlebar 30. The collars 34, 36 may be made narrower or compressed by way of bolt 52. To secure the grip 12 onto the end portion of the handlebar 30, the grip 12 is placed over the handlebar, as shown in FIG. 2. The collar 34 is loosened and placed over the flanges 40 at the proximal side of the grip 12. Once the flanges 40 are disposed over the handlebar 30, the collar 34 is tightened by engaging the bolt 52. By tightening the bolt 52, the collar 34 compresses the flanges 40 onto the handlebar 30. The collar 36 is also placed over the flanges 40 in the handlebar 30 and its bolt 52 is tightened to further secure the collar 34 and the flanges 40 to the handlebar 30. The collar 36 has the same configuration as that of collar 34 except that collar 36 has a distal lip 54.

The distal lip 54 is part of the latching mechanism that allows the end cap 28 to be removably attachable to the handlebar 30. In particular, the end cap 28 has tabs 56, 58 that are traversable between an engaged position and a disengaged position. In the engaged position, the tabs 56, 58 are biased outward and catches the lip 54. In the disengaged position, the tabs 56, 58 are pushed inward by a person's fingers and releases the lip 54.

Figure 5:
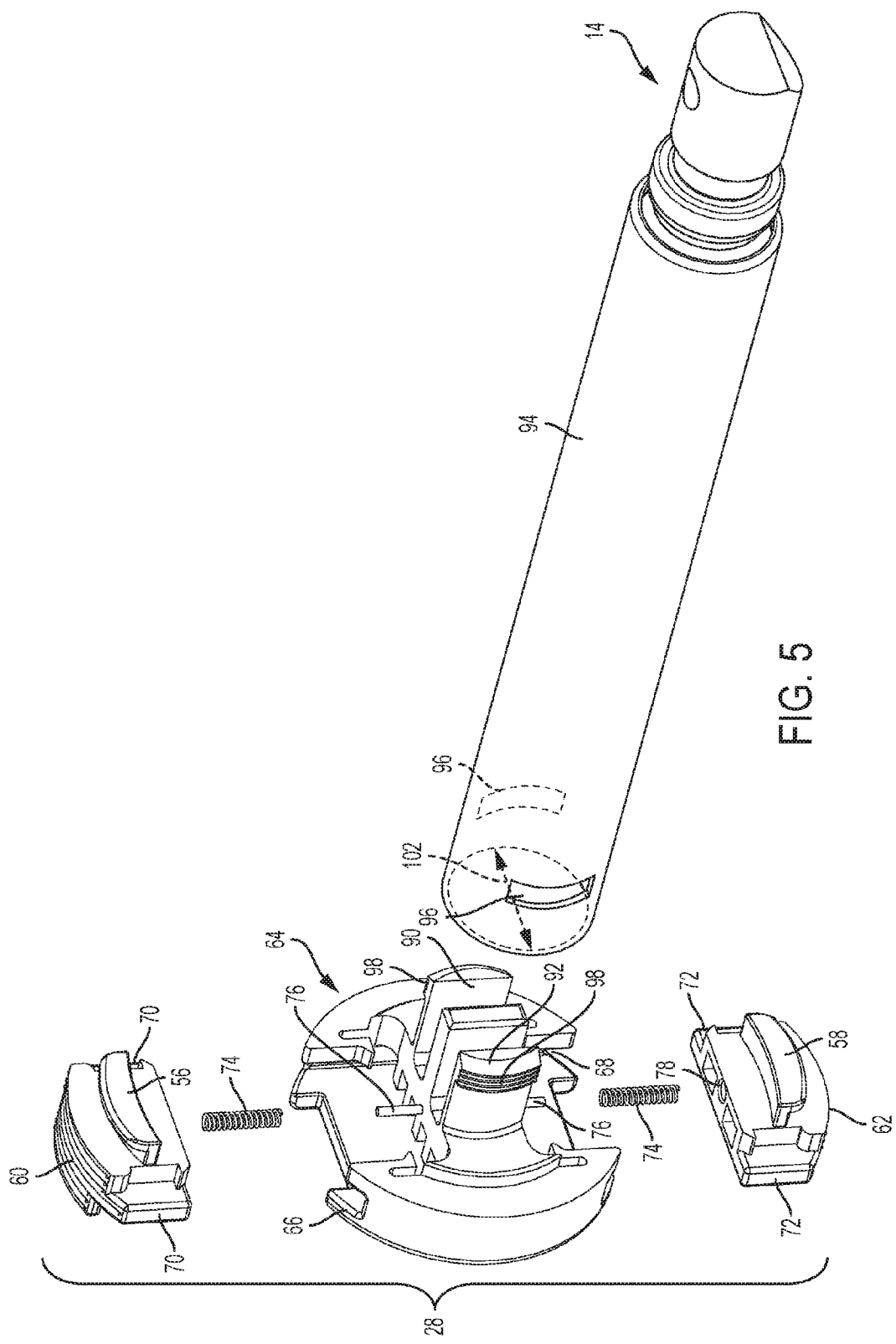
FIG. 5 illustrates an exploded perspective view of a mechanism for attaching the object to the handle.

Referring now to FIG. 5, the pepper spray 14 is shown exploded off of the end cap assembly 28. The end cap assembly 28 includes the tabs 56, 58. The tabs 56, 58 are attached to buttons 60, 62. The tabs 56, 58 are preferably integrally formed with the buttons 60, 62 in that they 56, 60 and 58, 62 may be injection molded as a single piece. The end cap 28 additionally has a disc shaped body 64. The body 64 may have slots 66, 68 on opposed sides that receive the buttons 60, 62. In particular, the buttons 60, 62 have tongues 70, 72 that are slidably received into the slots 66, 68. The buttons 60, 62 can slide within the slots 66, 68 between the two positions, namely, the disengaged position and the engaged position. The end cap assembly 28 also has springs 74 which bias the buttons 60, 62 to the engaged position. The springs 74 are retained and positioned on post 76 formed integrally with the body 64. The post 76 extends away from each other as shown in FIG. 5. An outer diameter of the post 76 is smaller than an inner diameter of the spring 74 so that the spring 74 can freely be compressed onto the post 76. The buttons 60, 62 may each have a receiving hole 78 that receives the spring 78. The springs 74 are trapped between the post 76 and the hole 78.

Figure 6:
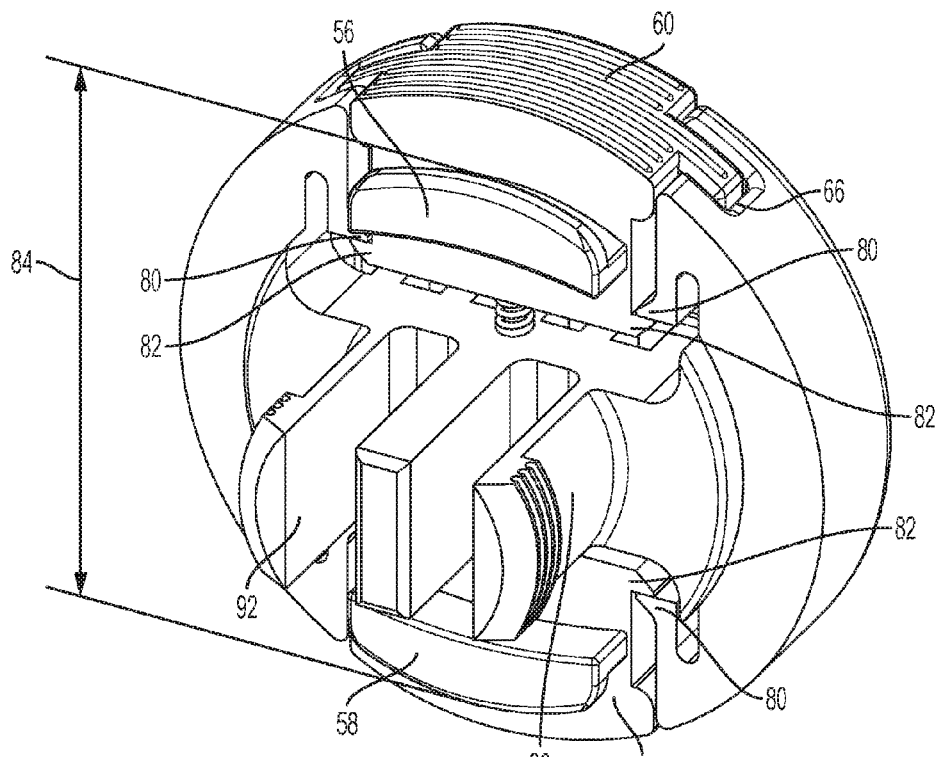
FIG. 6 illustrates an assembled perspective view of the mechanism shown in FIG. 5 with buttons in an engaged position.

When the buttons 60, 62 are depressed to the disengaged position and released, the springs 74 push the buttons 60, 62 back out to the engaged position. To hold the position of the buttons 60, 62 in the engaged position as shown in FIG. 6, the body has inwardly directed pairs of feet 80 which hold each of the buttons 60, 62 in place when the person releases the buttons 60, 62. The buttons have outwardly directed fingers 82 that catch the inwardly directed feet 80. In this way, the buttons 60, 62 do not pop out of the slots 66, 68. The exterior surfaces of the buttons 60, 62 may have a curved configuration together with the exterior circumference of the body 64 that forms a circular configuration when the buttons 60, 62 are in the engaged position.

Figure 4:
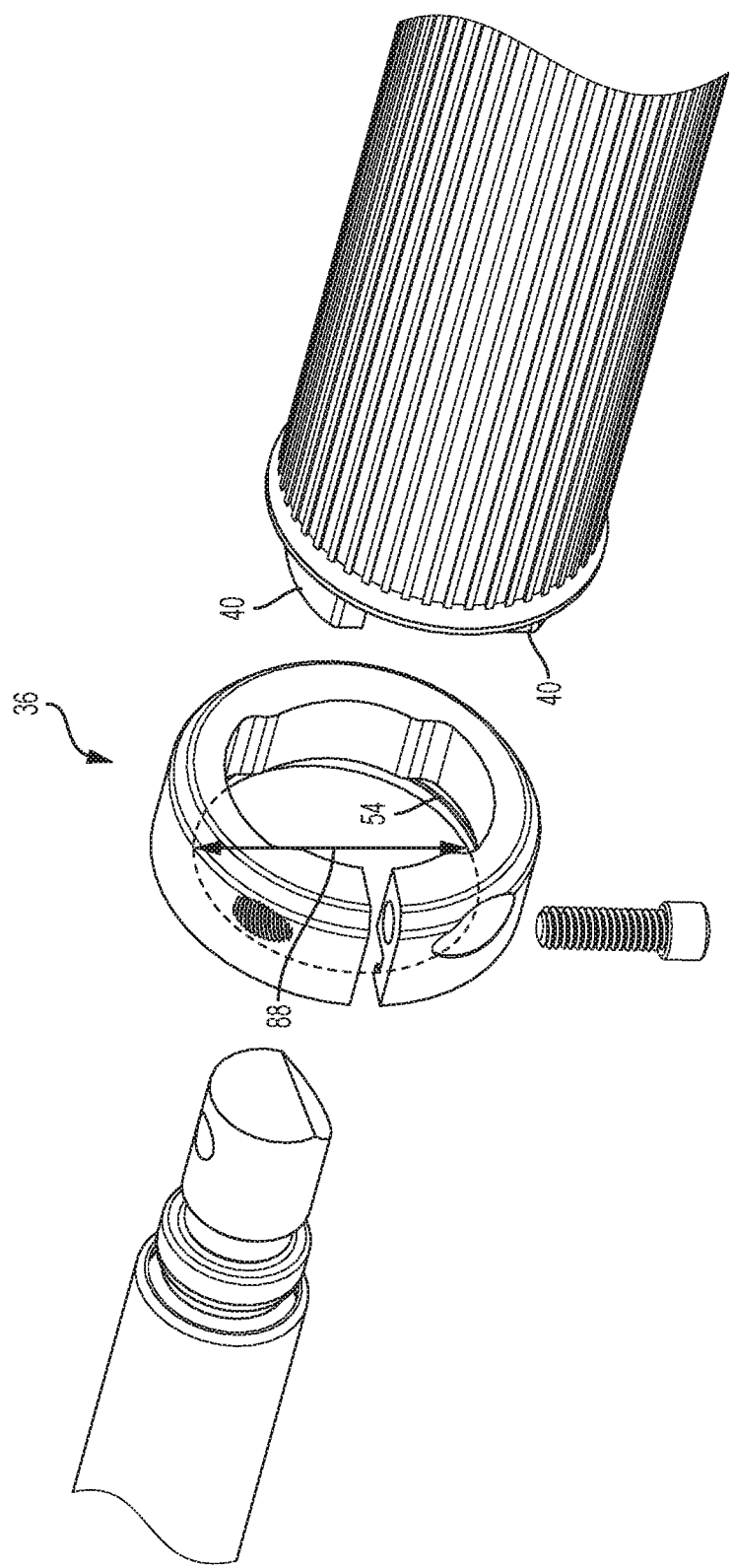
FIG. 4 illustrates an exploded perspective view of another collar for attaching the handle to the tube.

As discussed above, the buttons 60, 62 and likewise the tabs 56, 58 may be traversed between engaged and disengaged positions. In the engaged position, the tabs 56, 58 interfere or contact the lip 54 in the distal collar 36 (see FIG. 4). In the disengaged position, the tabs 56, 58 do not interfere or contact the lip 54 in the distal collar 36 because the tabs 56, 58 are displaced closer to each other in the disengaged position compared to the engaged position.

Figure 7:
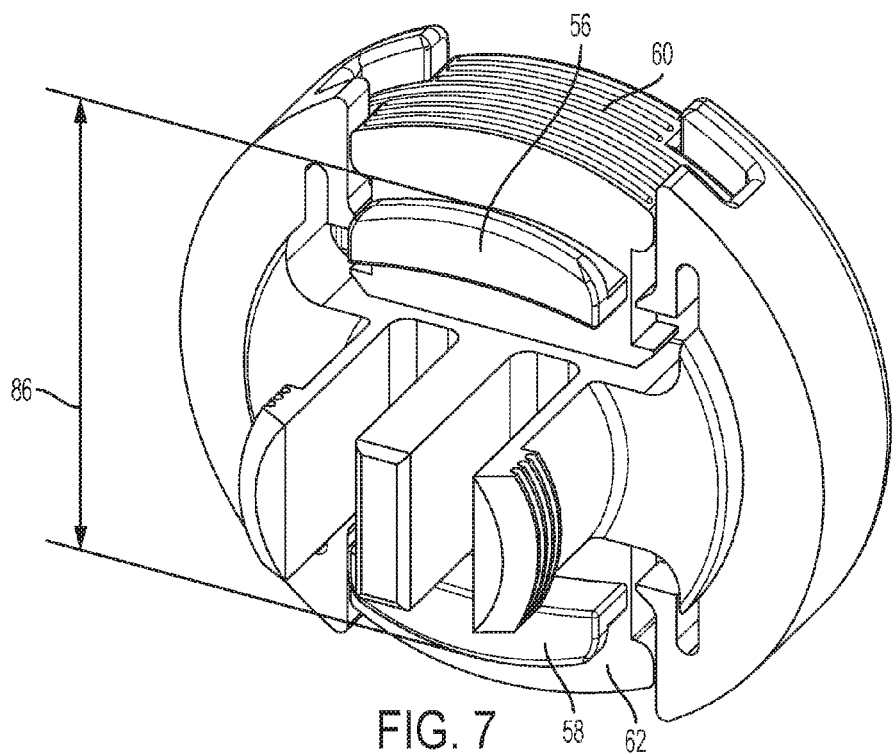
FIG. 7 illustrates the mechanism shown in FIG. 6 with the buttons in a disengaged position.

Referring now to FIGS. 6 and 7, the tabs are shown in the engaged position and the disengaged position respectively. In the engaged position, the tabs 56, 58 define a distance 84. The distance 84 is measured from the widest part of the tab 56, 58 when the buttons 60, 62 are in the engaged position. In the disengaged position, the tabs 56, 58, as shown in FIG. 7, define a distance 86. The distance 86 is less than or equal to the inner diameter 88 of the lip 54, whereas, the distance 84 is greater than or equal to the inner diameter 88 of the lip 54. In this way, the end cap 28 is removably attached to the collar 36 by depressing the buttons 60, 62 or releasing them. A radius of the outer periphery of the tabs 56, 58 may be smaller than a radius of an inner periphery of the lip 54 so that the tabs 56, 58 may clear the lip 54 when the tabs are traversed to the disengaged position.

The body 64 also has prongs 90, 92 which can deflect inward but resiliently deflect back outward to its normal position shown in FIGS. 6 and 7. The object 10 may be secured to the body 64 with the prongs 90, 92. By way of example and not limitation, the object 14 may be held within a tubular member 94. The tubular member 94 may have apertures 96 that receive ridged extensions 98. The outer diameter 100 of the ridged extensions 98 is greater than an inner diameter 102 while an outer diameter of the prongs 90, 92 at its base is slightly smaller than the inner diameter 102 of the tubular member 94. A leading edge of the prongs 90, 92 may be significantly smaller than the inner diameter 102 of the tubular member 94 to help the user insert the prongs 90, 92 into the tubular member 94. The leading edge portion of the prongs 90, 92 above the ridged extensions 98 is preferably beveled to help deflect the prongs 90, 92 inward.

Figure 13:
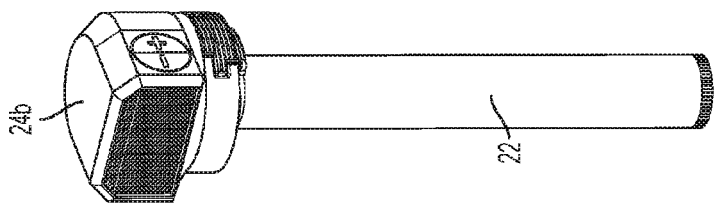
FIG. 13 illustrates object as the battery storage container for powering a speaker.
Figure 12:
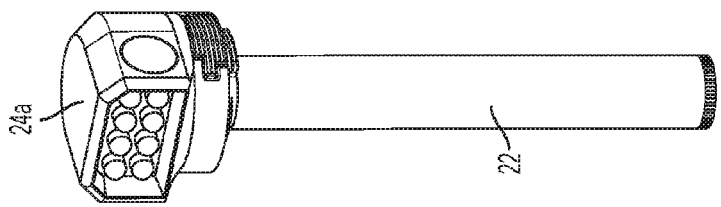
FIG. 12 illustrates the object as a battery storage container for powering a light.
Figure 11:
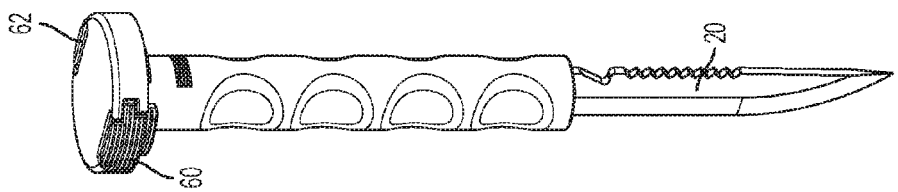
FIG. 11 illustrates the object as a knife.
Figure 10:
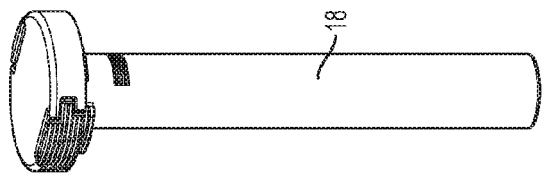
FIG. 10 illustrates the object as a storage container.
Figure 9:
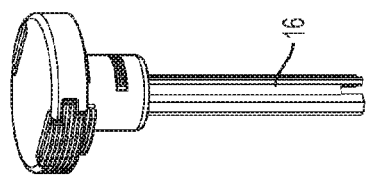
FIG. 9 illustrates the object as a tool.
Figure 8:
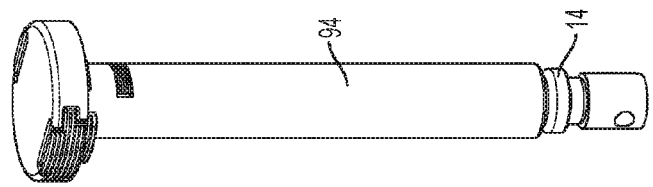
FIG. 8 illustrates an object as a pepper spray.

Referring now to FIGS. 8-13, the object 10 may be any one of a plurality of different types of objects. For example, as shown in FIGS. 8 and 9 and discussed above, the object 10 may be a pepper spray 14 which is embedded within a tubular member 94. The object 10 may also be a tool 16. The object 14 may also be a storage container 18 as shown in FIG. 10. The object may also be a knife 20, as shown in FIG. 11. As shown in FIGS. 12 and 13, the object 10 may be a battery 22 which may be contained within a tubular member 94 for powering a light 24a or speaker system 24b. Regardless of the object 10 being hidden within the handle 12, the object 10 may be quickly detached and removed from the handle by depressing the buttons 60, 62. Moreover, the buttons 60, 62 which are on opposite sides of the end cap 28 prevent the object 10 from inadvertently being dislodged from the handle 12 if the handle 12 was to fall down and accidently hit the ground or table or some other hard object that might depress one of the buttons 60, 62 but would not depress both 60, 62 simultaneously to detach the end cap assembly 28 from the handle 12.

Figure 14:
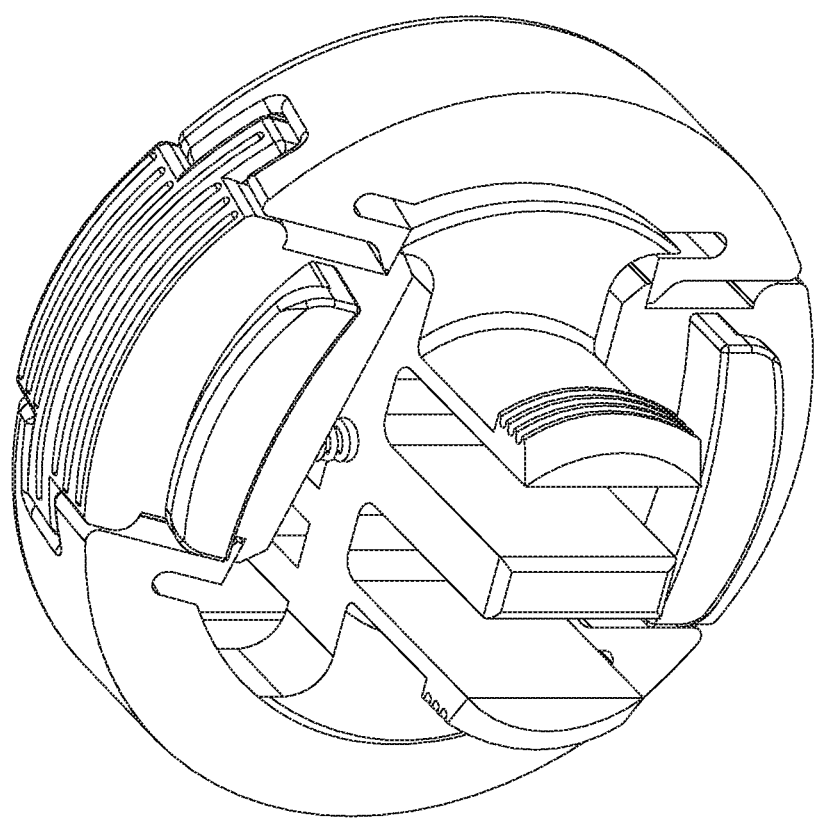
FIG. 14 illustrates a variant of the first embodiment wherein the buttons are offset at an angle other than 180° from each other.
Figure 15:
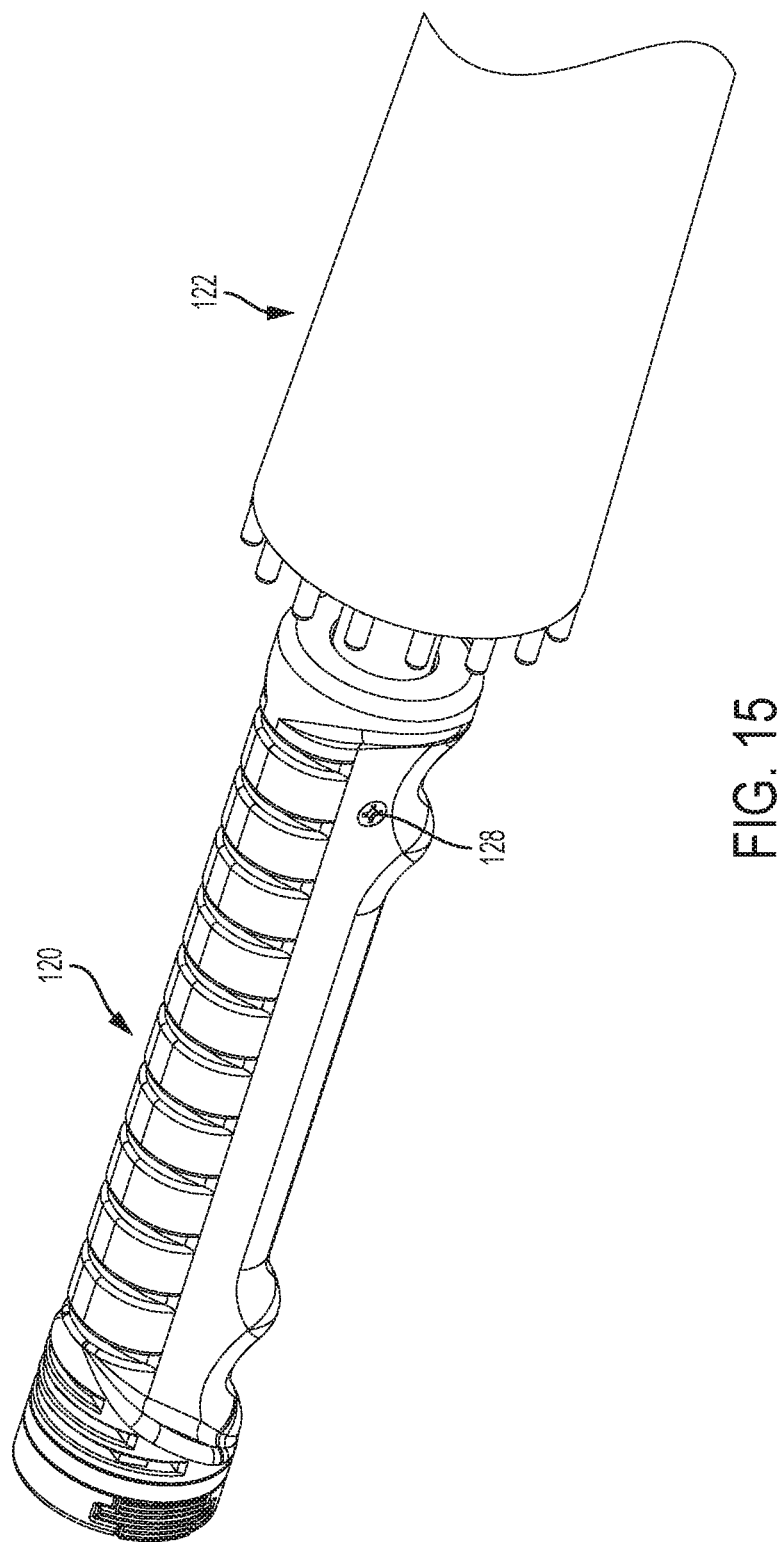
FIG. 15 illustrates a second embodiment of the quick disconnect storage compartment with the object inserted into the handle.
Figure 16:
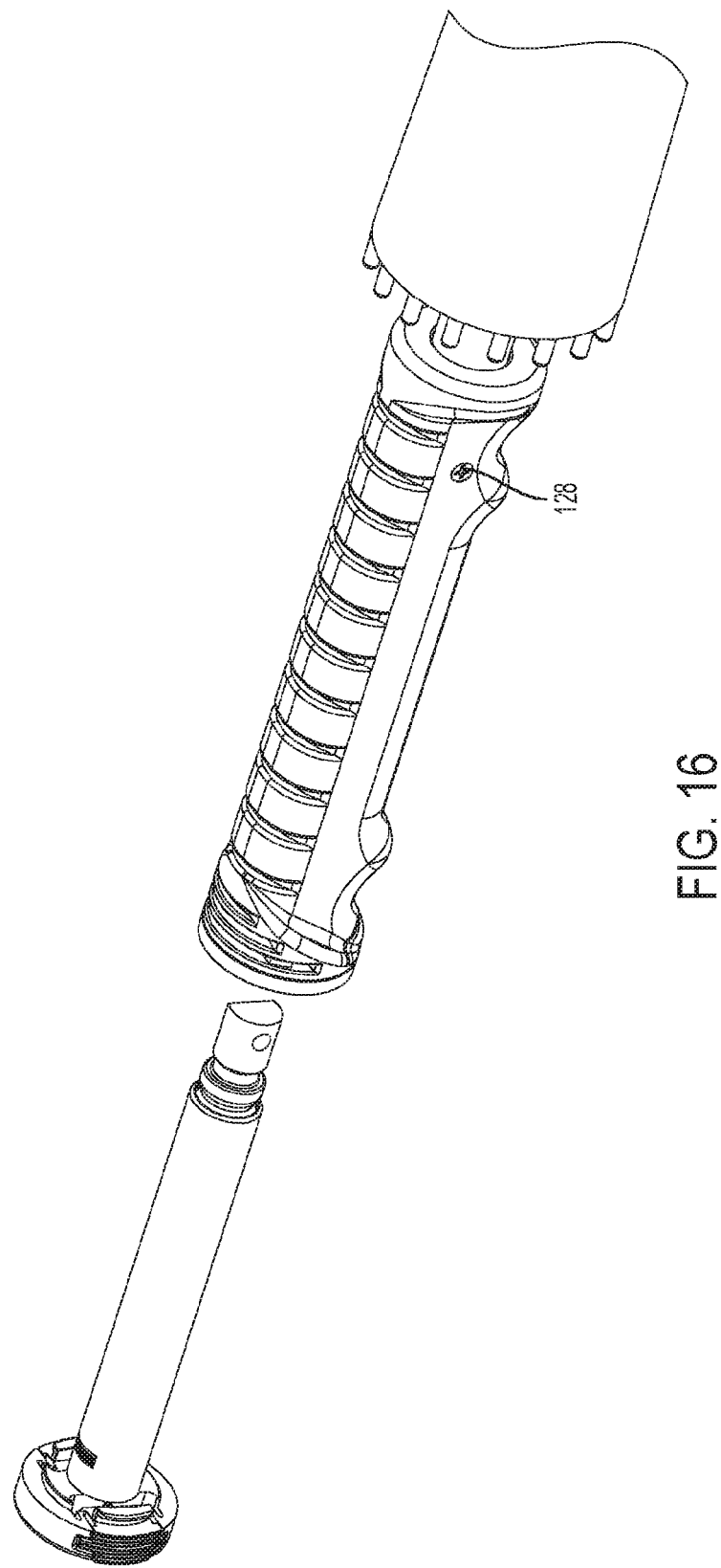
FIG. 16 illustrates the second embodiment of the quick disconnect storage compartment with the object removed from the handle.
Figure 17:
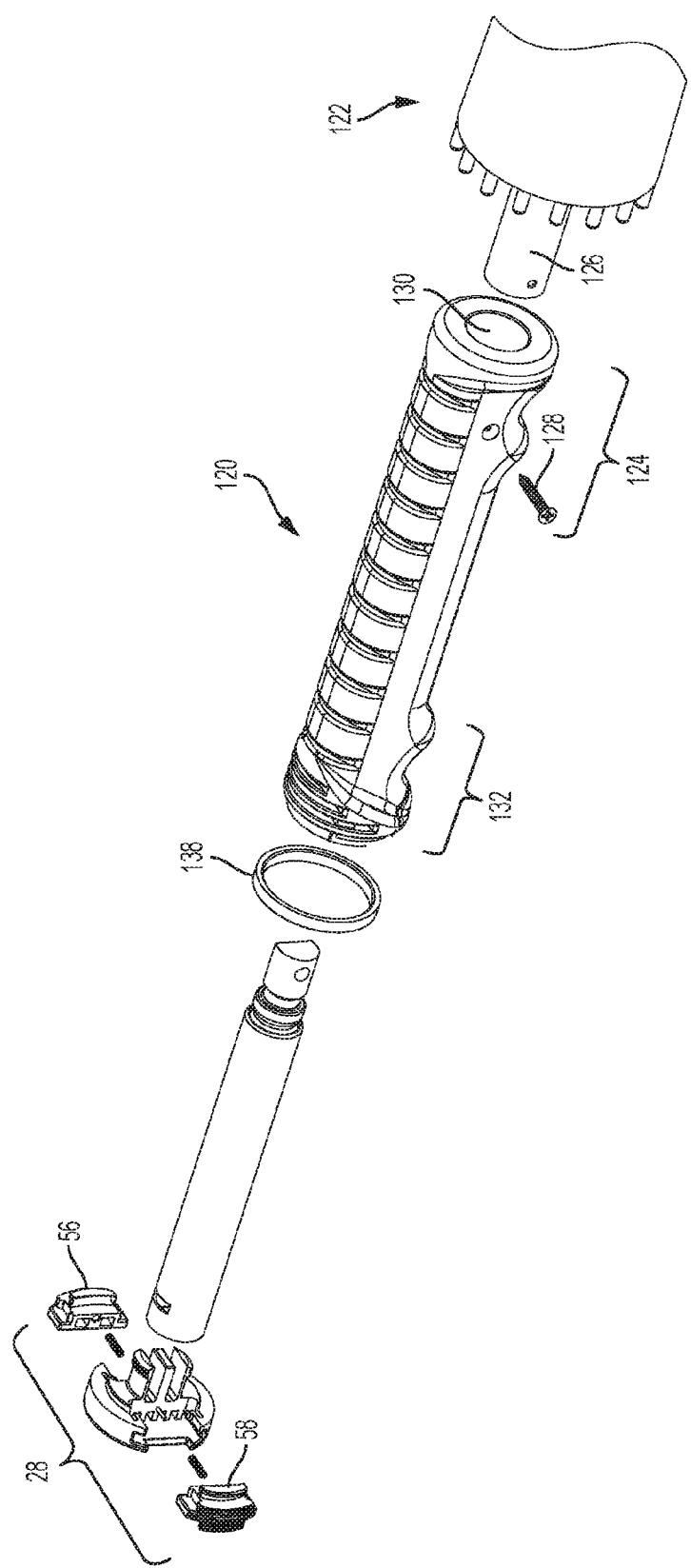
FIG. 17 illustrates an exploded perspective view of the second embodiment of the quick disconnect storage compartment.
Figure 18:
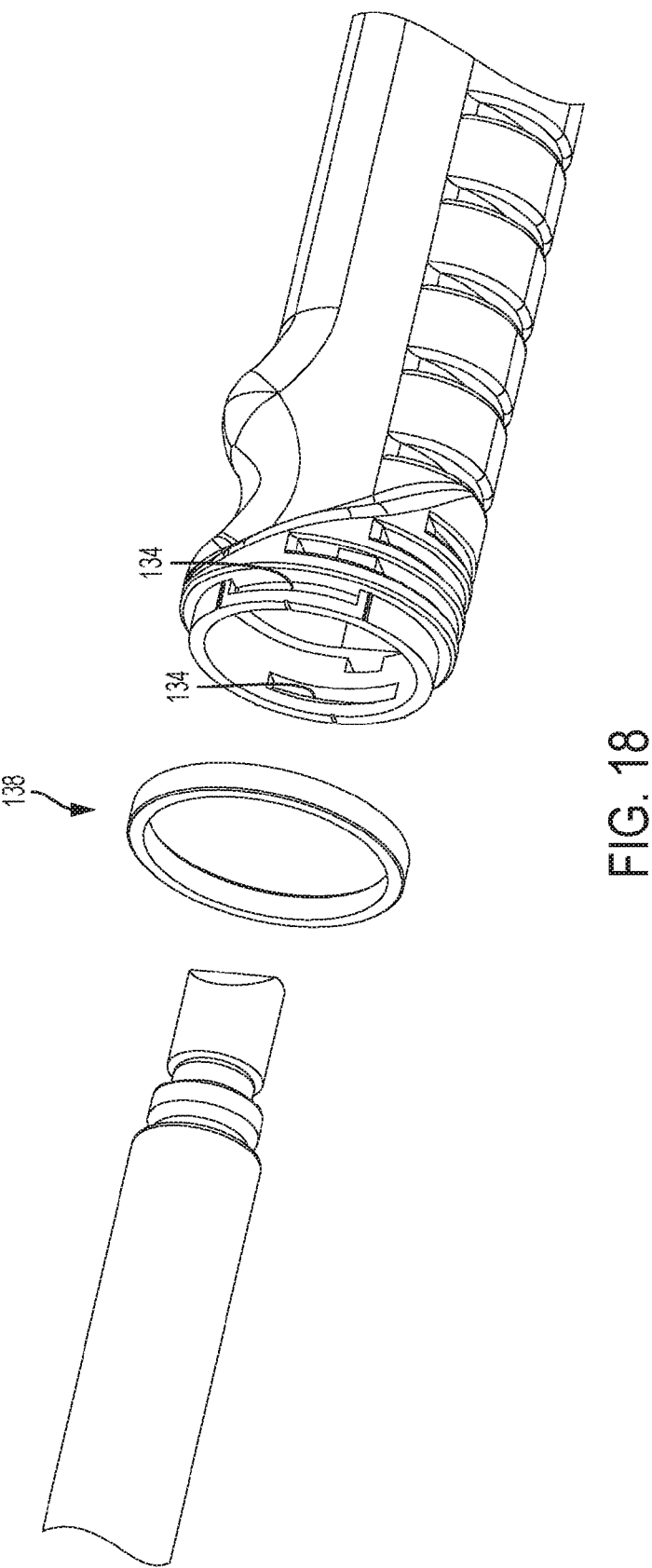
FIG. 18 illustrates an exploded view of a ring disposable over lips with engaged tabs.

Referring now to FIG. 14, it is also contemplated that the buttons 60, 62 may be placed in various angular orientations. In FIGS. 6 and 7, the buttons 60, 62 are 180° opposite of each other. However, other angular orientations are also contemplated. By way of example and not limitation, the angular orientation of the buttons 60, 62 may be 135°, 90° or 45°. Simply put, the buttons 60, 62 may be placed in any angular orientation with respect to each other between 45° and 180°.

Additionally, the tool 10 being inserted into the handle 12 for storage may extend past a length of the handle into the tube 30. Additionally, if the object 10 is flexible, then the object 10 can be inserted into the handle 12 and into the tube 34 as required.

Referring now to FIGS. 15-18, the handle 120 may be attached a device 122 (e.g. umbrella) in a different manner compared to that shown and described in FIGS. 1-7. In particular, the handle 120 may be an injection molded piece wherein its proximal end portion 124 is screwed on to a tubular member 126 with a screw 128 and/or glued/adhered.

The handle 120 may be an injection molded plastic piece that has an exterior surface contoured to provide grip for a user. The handle 120 is fabricated to have an interior cavity 130 in which the object 10 may be stored when concealed. A distal end portion 132 may have opposed lips 134 formed therein which catch the tabs 56, 58 of the end cap assembly 28 to retain the tool or object 10 within the handle 120 when the tabs 56, 58 are in the engaged position. The tabs 56, 58 operate in the same manner as discussed above in relation to FIGS. 1-8 in that the distance 84 between the tabs 56, 58 is greater than an inner diameter 136 of the distal end portion 132 of the handle 120, whereas, the distance 86 of the tabs 56, 58 is less than the inner diameter 136 of the distal end portion 132 of the handle 120.

The lips 134 may be covered by a ring 138 which can be adhered, press fitted, or somehow attached to the distal end portion 132 of the handle 120 to cover/hide 56, 58, 134.

Figure 19:
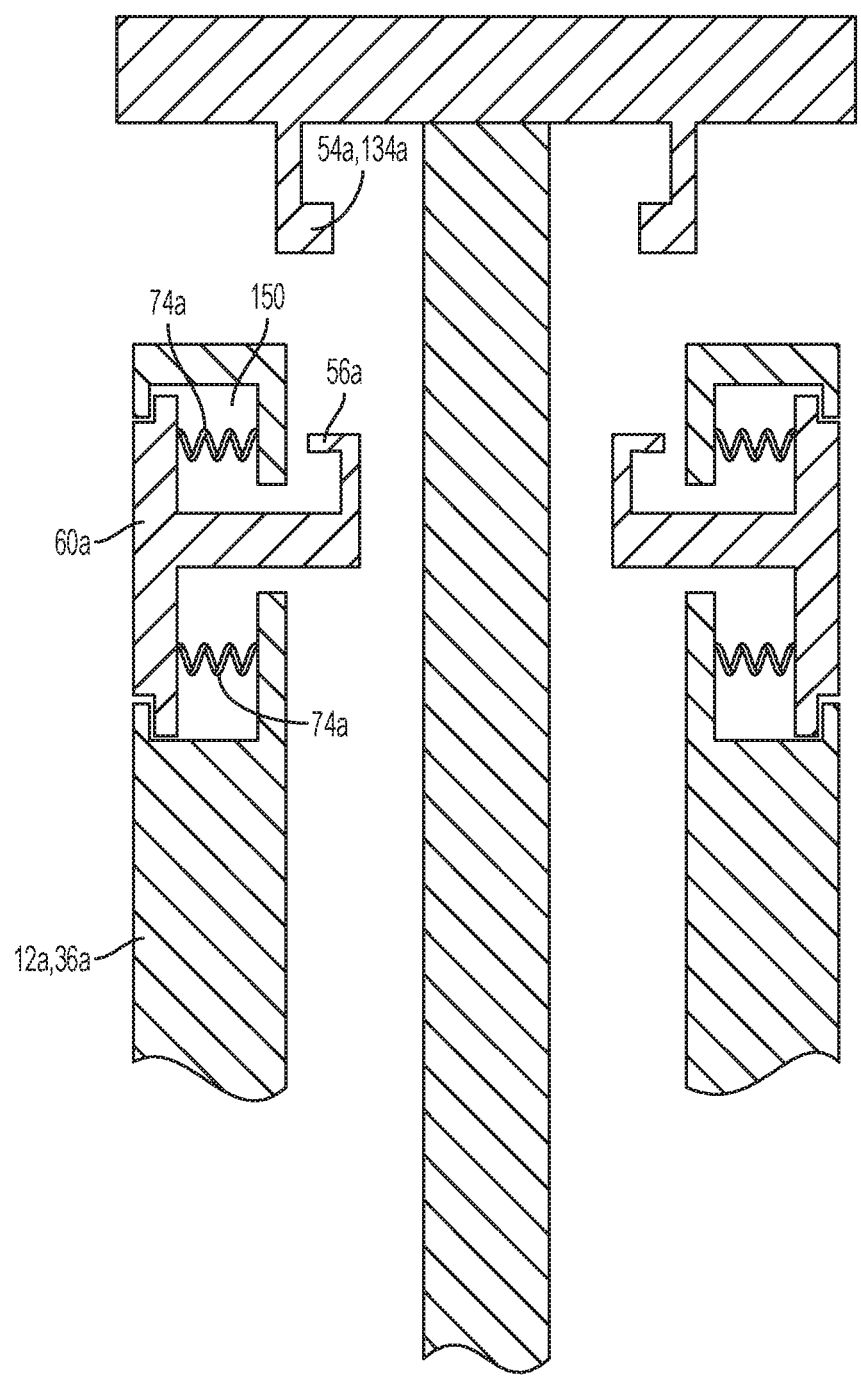
FIG. 19 illustrates a variant of the first and second embodiments of the quick disconnect storage compartment wherein the buttons are incorporated into the handle instead of an end cap.

Referring now to FIG. 19, a variant of the first and second embodiments of the quick disconnect storage compartment is disclosed. In the first and second embodiments of the quick disconnect storage compartment, the buttons 60 were incorporated into the endcap 28. However, it is also contemplated that the buttons 60a may be incorporated into the handle 12a or the distal collar 36a. The buttons 60a have tabs that engage the lips 54a, 134a. The buttons 60a and tabs 56a, 58a are biased to the engaged position with springs 74a. The springs 74a are disposed on opposed sides of a shaft that connects the buttons 60a to the tabs 56a, 58a to balance the buttons 60a while it is being traversed between engaged and disengaged positions. The buttons 60a are retained within a cavity 150 formed in the handle 12a or distal collar 36a. The engaged position shown in FIG. 19, the lips 54a, 134a are trapped under the tabs 56a, 58a. To remove the object from the handle, the buttons 60a are depressed to traverse the tabs 56a, 58a from the engaged position to the disengaged position. In the disengaged position, the lips 54a, 134a are not trapped under the tabs 56a, 58a. Rather, the lips 54a, 134a may be lifted up in order to remove the object from the handle. In this manner, when the user removes the object from the handle, the user grips the buttons with one hand while securely removing the object with the other hand. This allows for greater retention of the object since the same hand is not both operating the button and gripping the object.

The above description is given by way of example, and not limitation. Given the above disclosure, one skilled in the art could devise variations that are within the scope and spirit of the invention disclosed herein, including various ways of securing the handle to a tube. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A method for deploying an object hidden within a bicycle handle grip of a bicycle handlebar, the method comprising the steps of:
   gripping the bicycle handle grip of the bicycle handlebar with a first hand of a user;
   gripping an end cap disposed at an end of the bicycle handle grip with a second hand of the user;
   applying oppositely directed forces on first and second buttons formed on the end cap;
   disengaging first and second latches from first and second catches wherein the first and second latches are formed on one of the end cap and a collar extending around the bicycle handlebar, and the first and second catches are formed on the other one of the end cap and the collar extending around the bicycle handlebar; and
   pulling the end cap with the second hand of the user to remove the object hidden within the bicycle handle grip from the bicycle handle grip.

2. The method of claim 1 wherein the applying step includes the step of applying oppositely directed forces 180 degrees toward each other.

3. The method of claim 1 wherein the disengaging step includes disengaging first and second latches formed on the first and second buttons from first and second catches formed on the collar extending around the bicycle handlebar.

4. The method of claim 1 wherein the first and second catches are undercut recesses formed in an interior surface of the collar extending around the handle and the first and second buttons have protrusions that are traversable between biased out position to engage the protrusions to the catches and a depressed position to disengage the protrusions from the catches.

5. A method for deploying an object hidden within a bicycle handle grip of a bicycle handlebar, the method comprising the steps of:
   disengaging an end cap from a collar extending around the bicycle handlebar by applying oppositely directed forces on first and second buttons positioned adjacent the bicycle handlebar wherein the disengaging step includes disengaging first and second buttons, both of which have a portion separated from the bicycle handlebar in an axial direction; and
   pulling the end cap away from the bicycle handlebar to remove the object hidden within the bicycle handle grip from the bicycle handle grip.

6. The method of claim 5, wherein the disengaging step includes applying oppositely directed forces 180 degrees toward each other.

7. The method of claim 5, wherein the pulling step includes gripping the end cap with a first hand of a user and gripping the bicycle handlebar with a second hand of the user.

8. A method for deploying an object hidden within a bicycle handle grip of a bicycle handlebar, the method comprising the steps of:
   disengaging an end cap from a collar extending around the bicycle handlebar by applying oppositely directed forces on first and second buttons positioned adjacent the bicycle handlebar wherein the disengaging step includes disengaging first and second latches coupled to respective ones of the first and second buttons, from at least one catch formed on the collar; and
   pulling the end cap away from the bicycle handlebar to remove the object hidden within the bicycle handle grip from the bicycle handle grip.

9. A method of removing an object from a bicycle handlebar extending along an axis, the method comprising the steps of:
   actuating a pair of buttons, each button having a portion spaced from the handlebar along the axis, actuation of the pair of buttons causing the buttons to transition from a first position to a second position, the pair of buttons being engaged with a collar coupled to the bicycle handlebar when the pair of buttons are in the first position, and the pair of buttons being disengaged from the collar when the pair of buttons are in the second position; and
   removing the end cap from the bicycle handlebar when the pair of buttons are in the second position.

10. The method of claim 9, wherein the actuating step includes applying oppositely directed forces 180 degrees toward each other.

11. The method of claim 9, wherein the actuating step includes disengaging a pair of tabs coupled to respective ones of the pair of buttons, from at least one lip formed on the collar.

12. The method of claim 9, wherein the removing step includes gripping the end cap with a first hand of a user and gripping the bicycle handlebar with a second hand of the user.

* * * * *